United States Patent Office 3,061,353
Patented Oct. 30, 1962

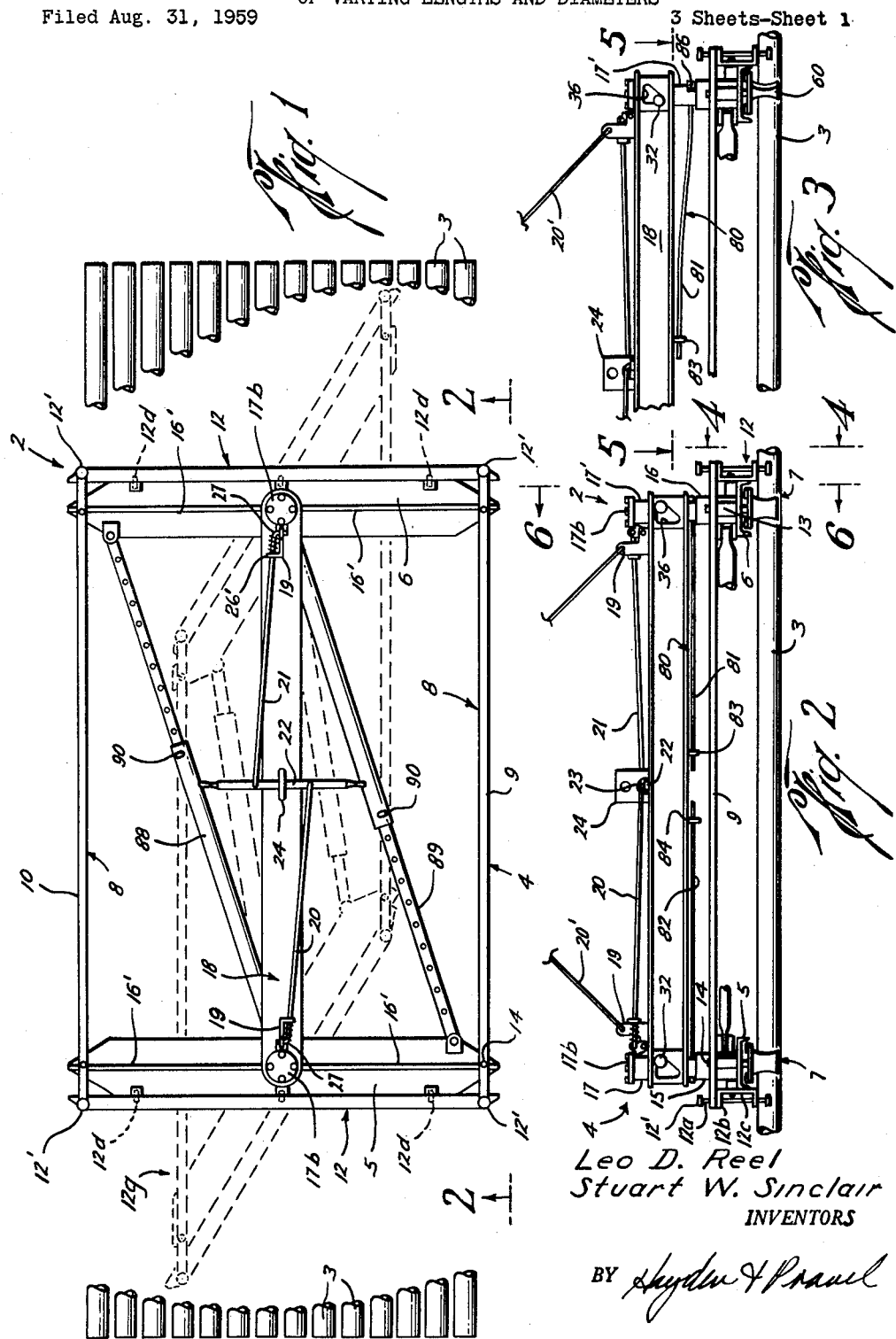

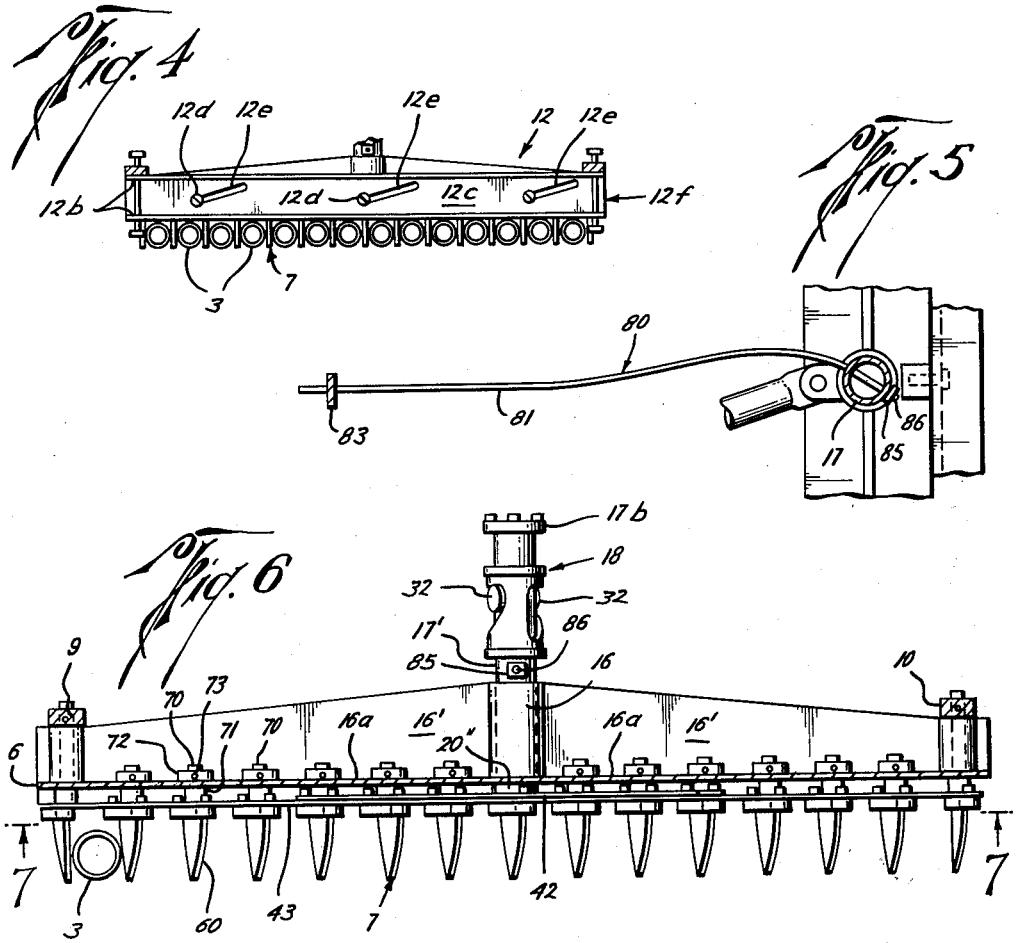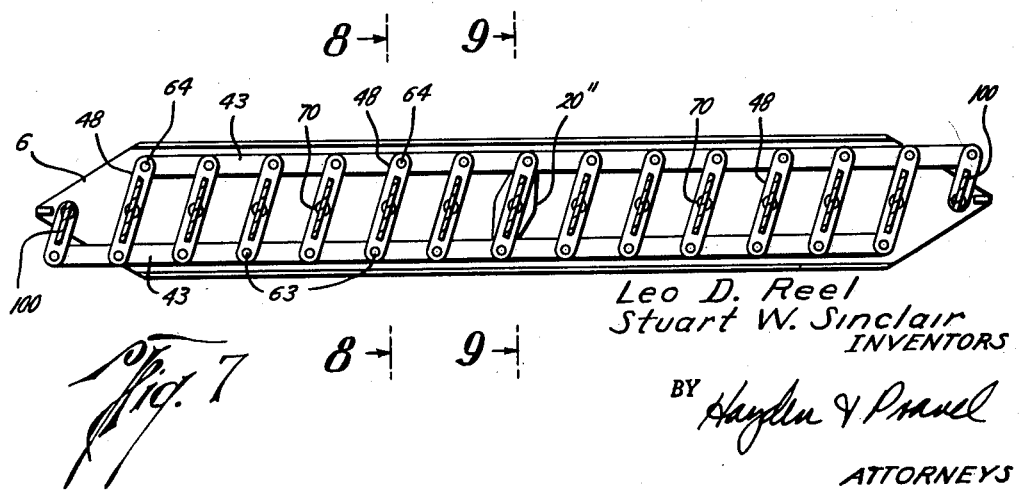

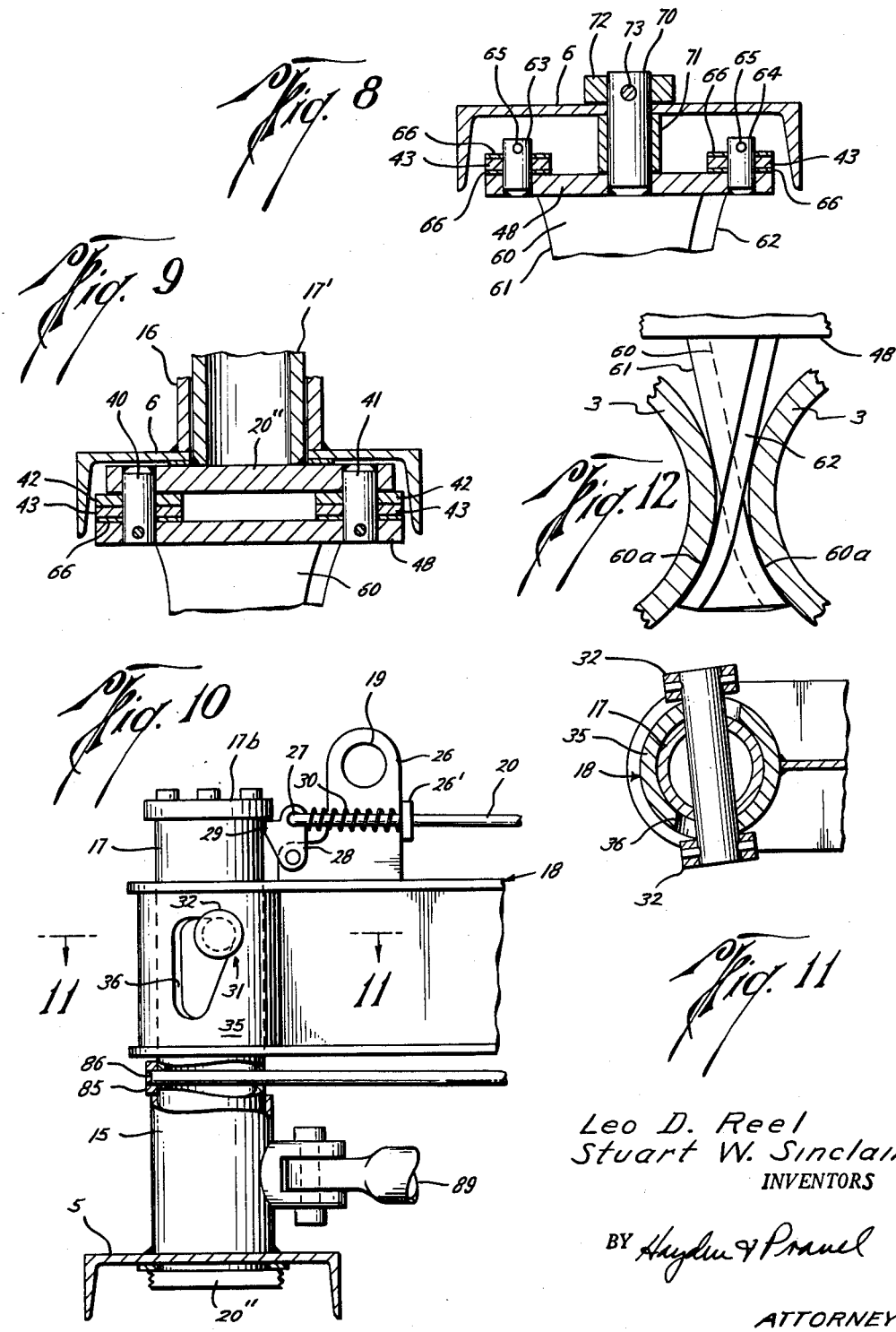

3,061,353
APPARATUS FOR ENGAGING AND MOVING ELONGATED TUBULAR OBJECTS SUCH AS PIPE AND THE LIKE OF VARYING LENGTHS AND DIAMETERS
Leo D. Reel and Stuart W. Sinclair, Houston, Tex.; said Sinclair assignor to said Leo D. Reel, Houston, Tex.
Filed Aug. 31, 1959, Ser. No. 836,954
9 Claims. (Cl. 294—67)

The present invention relates to a device for engaging tubular objects such as pipe and the like, and more particularly to a device which may be adjusted for engaging tubular objects such as pipe and the like of varying diameters.

The present invention is directed to an improved form of device as disclosed in application Serial No. 740,686, filed in the name of Stuart W. Sinclair on June 9, 1958 for an invention in "Apparatus for Engaging and Moving Elongated Tubular Objects Such as Pipe and the Like of Varying Lengths and Diameters."

Heretofore, it has been customary to move pipe from a pipe rack onto a truck, or from a truck onto a pipe rack by manually loading or unloading the pipe one at a time. This procedure is extremely time consuming and expensive, and in some circumstances heavy equipment must be employed to aid in lifting the pipe and positioning it from one location to another.

The present invention is directed to a device which may be used for engaging a plurality of pipe at one time whereby the pipe may be lifted and moved from one location to another as desired. The present invention also contemplates a construction of relatively simple design which may be adjusted for accommodating pipe of varying diameter.

Another object of the present invention is to provide a device for engaging a plurality of pipe simultaneously whereby the pipe may be lifted and engaged, the device incorporating a plurality of pipe engaging members which is normally retained in nonengaging position, and which device employs a spring loaded arrangement which is normally in relaxed position when the tubular or pipe engaging means is not in engaging position, but which spring means tends to move the pipe engaging means toward nonengaging position when they are activated.

Another object of the present invention is to provide a frame for engaging and lifting a plurality of tubular members such as pipe or the like, which frame includes a plurality of pipe engaging members carried thereby and rotatable in a horizontal plane to and from pipe engaging position, and spring means operable when said pipe engaging members are activated and normally urging said members to a non-pipe engaging position whereby the pipe engaging members may be positioned for engaging pipe when the frame is positioned on the pipe.

Yet a further object of the present invention is to provide a pipe engaging member of a configuration whereby the load of the weight of the pipe may be distributed over a substantially large surface area of the member.

Other objects and advantages of the present invention will become more readily apparent from a consideration of the following description and drawings wherein:

FIG. 1 is a top plan view of the present invention showing it positioned on a plurality of tubular objects such as pipe, the dotted line position representing the position of the frame when it has been skewed for receiving pipe of a different diameter from that illustrated;

FIG. 2 is a side view on the line 2—2 of FIG. 1, showing the device illustrated in FIG. 1 in position on a plurality of utbular objects such as pipe, and with the pipe engaging means in nonengaging relation relative to the pipe;

FIG. 3 is a partial view similar to FIG. 2 and illustrating the relationship of the parts of the device when the pipe engaging means have been actuated and engaged with the pipe for lifting the pipe;

FIG. 4 is an end view on the line 4—4 of FIG. 2, illustrating the means which automatically positions the frame at the proper vertical position relative to the tubular objects so that the pipe engaging members or means will be properly positioned for engaging pipe of any diameter;

FIG. 5 is a view on the line 5—5 of FIG. 3 and illustrates the position of the spring means when activated which tends to normally urge the pipe engaging means to their original nonengaging position after the device has been actuated;

FIG. 6 is an end view of the frame illustrating the manner of mounting the pipe or tubular engaging means in the frame and also illustrating in greater structural detail the arrangement of the means for actuating the pipe engaging means;

FIG. 7 is a view on the line 7—7 of FIG. 6 and illustrating a manner of spacing the pipe engaging means in the frame, and also the manner of rotating the pipe engaging means;

FIG. 8 is a sectional view on the line 8—8 of FIG. 7 and illustrates the manner of supporting a pipe engaging member rotatably in the frame, and the actuating rods for rotating the pipe engaging means;

FIG. 9 is a sectional view on the line 9—9 of FIG. 7 showing the manner of connecting the upwardly extending rotatable members to the rotatable pipe engaging means whereby rotation may be imparted to the pipe engaging means to engage pipe and similar tubular objects;

FIG. 10 is an enlarged view showing one end of the frame in greater detail to illustrate the manner of positioning the actuating means on the upwardly extending member which is rotatably carried by a support on each end of the housing;

FIG. 11 is a sectional view on the line 11—11 of FIG. 10 and illustrates in greater detail the manner of interconnection between the actuating means and the rotatable member whereby rotation is imparted to the rotatable member as the actuating means is raised or lowered; and, FIG. 12 is a partial sectional view showing the pipe engaging means activated and their surfaces engaging the tubular objects.

In FIGS. 1 and 2 of the drawings, the present invention is referred to generally by the numeral 2 and is shown resting on a plurality of elongated objects such as pipe 3, which are to be engaged by the device and lifted or moved from one location to another.

The device includes a frame generally indicated by the numeral 4 which includes the paired horizontally disposed members 5 and 6. Object engaging means designated generally at 7 are rotatably carried in each of the horizontally disposed members 5 and 6, whereby the objects to be engaged by the device, such as the pipe 3 may be supported in position on the frame members 5 and 6 and moved from location to location as desired.

Means indicated generally at 8 are provided for maintaining the horizontally disposed members 5 and 6 in spaced relation to each other so that the tubular or pipe members and the like which are to be engaged by the device will be contacted at two separate spaced locations between their ends. The means 8 which connect the horizontally disposed members 5 and 6 of the frame 4 together are shown in the drawings as comprising tie rods 9 and 10, which extend along each side of the frame 4 as shown in FIG. 1 of the drawings. Each tie rod 9 and 10 is pivotally connected at each end with the horizontally disposed members 5 and 6 by any suitable means. As illustrated in the drawings, such means includes the support 13 carried at each end of each of the members 5 and 6, which support 13 has engaged therewith a pivot pin 14 which extends through an opening (not shown) in each of the tie rods and into the support 13.

Means as illustrated generally by the number 12 is provided on each end adjacent the members 5 and 6 which means functions to position the frame 4 in a predetermined vertical position relative to the pipe 3, depending upon the diameter of the pipe so that the pipe engaging means 7 will be properly positioned to extend down between adjacent pipe or tubular objects for proper engagement therewith. It will be noted that each of the tie rods 9 and 10 terminate as illustrated at 12' in a pivotal connection on the adjusting means 12. The pivotal connection 12' at each corner of the frame may consist of a pin 12a which extends through an opening in each end of each of the rods 9 and 10 and through the flanges 12b extending from the portion 12c of the member 12f.

As more clearly illustrated in FIG. 4 of the drawings, the adjusting means generally designated at 12 is supported on each of the horizontally disposed members 5 and 6 by any suitable means such as the projections 12d which are secured by any suitable means such as welding or the like at spaced intervals on the top of each of the horizontally disposed members 5 and 6 as more clearly illustrated in FIG. 1 of the drawings. The projections 12d extend through spaced slots 12e which are provided in each of the portions 12c of the members 12f. The slots 12e are at an angle relative to the vertical as indicated, and if desired the end of the projections 12d may be enlarged to retain them in position as the slots 12e and projections 12d move or slide relative to each other. The members 12f may be formed of any suitable material, and may be formed of channel iron in which event the portion 12c will be the web of the channel, with the flanges or projections 12b formed on each end thereof.

The tie rods 9 and 10 pivotally connect the frame members 5 and 6 together and maintain them in a predetermined desired spaced relationship. Also, the members 9 and 10 are also pivotally connected with the member 12f of the adjusting means as previously indicated and as the device is moved from the full line position shown in FIG. 1 to the skewed relationship illustrated in dotted line at 12g of FIG. 1, the plate 12f will be lowered by reason of the projections 12d moving upwardly in each of the slots 12e. When the plate 12f is lowered as the frame is moved to the skewed relationship as indicated in dotted line in FIG. 1, the bottom projection or flange 12b of the plate 12f will also be lowered so that it will engage the row of pipe and thereby position the pipe engaging means 7 at a predetermined or suitable vertical relationship whereby the means 7 will properly engage in pipe 3 when they are rotated, as will be described in greater detail hereinafter.

The frame 4 also includes the housings 15 and 16, the housing 15 being secured midway of the member 5, and the member or support 16 being secured midway of the member 6 by any suitable means such as welding or the like as indicated in FIG. 6 of the drawings. If desired suitable reinforcing plates may extend from each side of each of the supports 15 and 16 to the outer end of each of the horizontally disposed members 5 and 6 as illustrated at 16' in FIG. 6 of the drawings. The reinforcing 16' may be secured to the housings 15 and 16 and to the supports 13 at the end of frame members 5 and 6 by any suitable means such as welding, and the reinforcing 16' may be welded along the lower edge 16a to each of the horizontally disposed members 5 and 6.

The supports 15 and 16 are hollow, and mounted therein are the vertically extending members 17 and 17' respectively. The members 17 and 17' extend through an opening in their respective horizontally disposed members 5 and 6 and are connected at their lowermost ends to a plate 20'' whereby the object engaging means 7 may be rotated as the members 17 and 17' are each rotated. The members 17 and 17' extend upwardly above their respective housings or supports 15 and 16, and may be provided with enlarged ends 17b which serve as a stop means for the actuating means 18 which extends between and is slidably carried on each of the vertically extending members 17 and 17' respectively.

Suitable means such as the member 19 may be provided on each side of the member 18 whereby a cable 20' or the like may be connected therewith so as to lift the frame 4 when desired. The lifting cable 20' is in turn connected by any suitable means well known in the art to a hoisting power mechanism such as a crane or the like, whereby the frame 4 may be lifted as will be more fully described hereinafter.

In order to retain the actuating member 18 in a nonmovable or nonactuating relationship relative to the vertically extending members 17 and 17', suitable means are provided for holding or locking the member 18 on the members 17 and 17'. The locking means include the rods 20 and 21 which extend longitudinally of the member or means 18 and are pivotally connected at their inner ends to the cross bar 22 which extends through the opening 23 in plate 24. The plate 24 is mounted on the member 18 and extends vertically therefrom as illustrated in FIGS. 1 and 2 of the drawings.

The members 19 which are mounted adjacent each end of the member 18, are provided with a projection 26' thereon. Each projection 26' has an opening therethrough through which each of the rods 20 and 21 extend respectively. The outermost end 27 of each of the rods is bent and is engaged with the member 28 which is pivotally mounted on the members 19 as illustrated in FIG. 10 of the drawings. The member 28 is provided with a projecting lip 29 which fits underneath the enlarged end 17b of each of the members 17 and 17' so as to hold the member 18 in a predetermined vertical position on the members 17 and 17'. If desired a spring 30 may be mounted on each of the rods 20 and 21 so as to abut the projections 26' of members 19 at one end and the member 28 at its other end so as to continually urge the member 28 into engagement with the nether side of the enlarged ends 17b.

The actuating means 18 is carried on each of the members 17 and 17' by suitable means as illustrated generally at 31 in FIG. 10 so that when the member 18 is moved upwardly and slidably along each of the members 17 and 17', rotation is imparted to the members 17 and 17' to in turn rotate the tubular engaging means 7 to engaging position. The means 31 as shown includes a pin 32 which extends from each side of each of the vertically extending members 17 and 17'. The pin 32 is secured to the members 17 and 17' by any suitable means, and if desired may be formed by means of a rod extending through an opening in the member 17 as illustrated in FIG. 11 of the drawings. The pin 32 may be mounted in a similar fashion in the vertically extending member 17' on the horizontally disposed member 6. The member 18 is provided with an end which is adapted to enclose and slide on the members 17 and 17' as illustrated at 35, which end is provided with a groove 36 of a particular or desired configuration so that when the member 18 is lifted, the pin 32 is guided in a manner in groove 36 so as to rotate each of the vertically extending members 17 and 17' respectively.

Thus, when the member 18 is in the position illustrated in FIG. 10 of the drawings, the pin 32 will assume the position as indicated in FIG. 10 in the groove 36 of the member 18. In this position the pins 32 in each member 17 and 17' will support the cross member 18 thereon. The position of the rods 20 and 21 with the member 28 on each end thereof engages beneath the enlarged ends 17b of each vertical member 17 and 17' and retains the member 18 in a nonmovable position relative to members 17 and 17' so that as the frame 4 is moved about by maens of cable 20', the tubular pipe engaging means as illustrated at 7 will assume the position indicated in FIG. 6 of the drawings. In this position, it will be noted that the members 7 are spaced apart a predetermined distance so as to receive pipe or tubular objects as indicated at 3 therein of any given diameter.

As previously noted, each of the vertically extending members 17 and 17' is connected at its lower end to the plate 20'' as better illustrated in FIGS. 6, 7, 9 and 10 of the drawings. Secured to and depending from the plate 20'' at each end are pins 40 and 41. The pins 40 and 41 extend through the top lever 42 and the bottom lever 43. Each of the levers 42 and 43 extend longitudinally of each of the horizontally disposed members 5 and 6 and on each side thereof as better illustrated in FIG. 9 of the drawings. As noted from FIG. 6, the top lever 42 extends only in the central portion of the members 5 and 6, whereas the lever 43 extends throughout the length of each of the horizontally disposed members 5 and 6 and on each side thereof, as best illustrated in FIG. 7 of the drawings.

The pins 40 and 41 extend downwardly and are connected at their lower ends in the member 48 which extends between the pins 40 and 41 as illustrated in FIG. 9 of the drawings. Secured to and depending from the connecting member 48 is a plate 60 which is one of the pipe engaging means 7.

As shown in FIGS. 8 and 9, the pipe engaging means 7 is in the form of a plurality of plate members 60 each of which plate members is provided with an arcuate side or edge portion 61 and 62, and each of which plate members are twisted about their longitudinal vertical axis as illustrated in FIG. 8 of the drawings. Each of the plate members 60 is secured at its upper end to the connecting member 48 as more clearly illustrated in FIGS. 7 and 8 of the drawnigs, and a pin 63 and 64 is secured by suitable means such as welding or the like at each end of the plate 48. The pins 63 and 64 extend through openings in the levers 43, and the levers 43 are held in engagement with the pins 63 and 64 by suitable means such as a key or pin 65 extending through the upper end of each of the pins 63 and 64 above lever 43.

If desired, suitable means such as a washer 66 may be provided on the pins 63 and 64 on each side of each of the levers 43 for reducing friction as the levers 43 move longitudinally of the frame members 5 and 6 to rotate the means 7.

The pins 64 are aligned longitudinally on one side of each member 5 and 6, and the pins 63 are aligned longitudinally on the other side of each member 5 and 6. The pins 64 are also aligned with the pin 41 in the center plate and the pins 63 are aligned with the pin 40 in the center plate 60.

Each of the plates 60 are held in position in each of the horizontally disposed members 5 and 6 by means of the vertically extending pins 70 each pin being surrounded by the spacer collar 71 so as to position the plate 60 vertically relative to the horizontally disposed member 5 or 6 in which they are mounted. The pin 70 extends upwardly through an opening in the plate as illustrated in FIG. 8 of the drawings and is provided with a lock washer 72 through which is engaged the pin 73 whereby the plate 60 is rotatably supported in each of the members 5 and 6.

It will be noted that the members 60 are laterally spaced on each of the horizontally disposed members 5 and 6 and the stems or pins 70 of each of the members are aligned centrally along the longitudinal axis of the members 5 and 6 as more clearly illustrated in FIGS. 6 and 7 of the drawings. Any suitable number of members 60 may be provided in lock plate 5 and 6 depending upon the size and number of pipe adapted to be engaged by the device of the present invention.

When the device is in the position illustrated in FIG. 2 of the drawings, the actuating means 18 is held in the non-slidable or non-movable position on each of the vertically extending members 17 and 17'. The relationship of the engaging means 7 is illustrated in FIGS. 7 and 8 of the drawings so that the plates 60 may extend downwardly between adjacent pipe or tubular objects 3, which position is illustrated in FIGS. 2 and 6 of the drawings. When it is desired to engage the tubular objects 3, the lever 22 may be grasped and rotated in a clockwise direction so that the rods 20 and 21 in members 28 are pivotally retracted and thereby disengaged from the enlarged end 17b of each of the vertically extending members 17 and 17'. Thereupon a lifting force may be applied to the frame 4 through the cable 20' and this moves the actuating means 18 upwardly relative to and along the vertically extending members 17 and 17'. When this occurs the pin 32 in slot 36 of the member 17 and 17' and the actuating means 18 respectively cooperate to simultaneously rotate each of the vertically extending members 17 and 17'. This rotation is transmitted through the plate 20'' to the pins 40 and 41 in the center plate 60 of the pipe engaging means and also to each of the levers 42 and 43 to move them longitudinally of the frame, the uppermost member 43 in FIG. 7 moving to the left as viewed in FIG. 7 and the lowermost lever 43 shown in FIG. 7 moving to the right as viewed in FIG. 7. The movement of each of the levers 43 on each side of each of the frame members 5 and 6 causes each of the plates 48 extending laterally therebetween to rotate whereupon each of the plates 60 connected therewith and depending therefrom are also rotated.

A half plate 60 is illustrated at 100 at each end of the members 5 and 6 and is connected with one of the levers 43 so as to rotate in the proper direction to engage the pipe. All of the plates 60 and the half plates at each end of each member 5 and 6 are rotatably mounted on the frame members 5 and 6.

Particular attention is directed to the configuration of each of the plates in that in addition to the arcuate side edges, they are twisted longitudinally of their vertical axis so that a substantial portion of each of the arcuate edges 61 and 62 engage adjacent pipe members as illustrated at 60a. The shape and twisted configuration of each of the plates distributes the weight of the tubular object more uniformly over a greater area.

When the pipe engaging plates 60 are rotated as described, they are in pipe engaging position and will remain in such position until the member 18 is again moved to its position illustrated in FIG. 2. When the member 18 is in lifting position with the plates 60 actuated to pipe engaging position, the member 18 will assume the position illustrated in FIG. 3 of the drawings wherein it will be noted that the pin 32 has moved to the lower end of slot 36 and this movement has caused the vertically extending members 17 and 17' to rotate in their housing 15 and 16 respectively as previously described. The enlarged upper ends 17b of each of the members 17 and 17' act as a stop to limit the upward movement of the member 18 whereby the frame 4 and engaged tubular members 3 may be moved about.

When the frame and pipe have been moved to a desired location they may be lowered to rest, and it is desirable when this occurs to return the plates 60 from a rotated position to a non-rotated position as illustrated in FIGS. 6 and 7 of the drawings so that the device may be withdrawn from engaging the tubular objects and engaged with another load. In order to accomplish this, suitable means as indicated at 80 are provided, which means is illustrated as being in the form of a rod 81 and 82 extending longitudinally on each side and below the actuating means 18. The inner end of each of the rods 81 and 82 is carried by the brackets 83 and 84 respectively. The other end of the rods 81 and 82 extend through the vertical extending members 17 and 17' respectively and are secured therewith by suitable means such as the bolt 85 which is secured to the outer end 86 of each of the rods 81 and 82 as better illustrated in FIGS. 5 and 10 of the drawings. It will be noted that the rods extend through the vertically extending members 17 and 17' immediately above each of the supports 15 and 16 and as the members 17 and 17' are each rotated, the rods 81 and 82 are bowed as indicated in FIG. 5 of the drawings. The rods 81 and 82 thereby each function as springs which are normally relaxed when the members 17 and 17' are in non-rotated position; however, when the actuating means 18 is lifted so that the vertically extending members 17 and 17' are rotated, each of the rods 81 and 82 are flexed or bowed and thereby tend to continually urge the plates 60 back to their normally non-engaging position. Thus, when the frame 4 is lowered so that the actuating means 18 slides downwardly and assumes its original position as illustrated in FIG. 2 of the drawings, the spring resiliency in each of the rods 81 and 82 will cause the levers 43 to rotate in an opposite direction thereby returning each of the plates 60 to their normally spaced relation as indicated in FIGS. 6 and 7 of the drawings.

The present invention is readily adaptable to engage pipe of different diameters and to accomplish this, the frame members 5 and 6 may be skewed as illustrated in dotted line in FIG. 1. The telescoping tie rods 88 and 89 are pivotally connected at their ends between each of the horizontally disposed members 5 and 6 by any suitable means and after the members 5 and 6 have been skewed as indicated in dotted line, the tie rods may be locked in this position by inserting a pin 90 through a corresponding hole in the telescoping tie rod sections 88 and 89 respectively. This will hold the horizontally disposed frame members 5 and 6 in any predetermined skewed relationship. When the frame members 5 and 6 are thus skewed, it is to accommodate pipe of different diameter from that shown or represented in full line, and it will thereby be necessary to position the horizontally disposed members 5 and 6 vertically relative to the tubular member 3 so that the plates 60 will be positioned between the adjacent tubular members 3 at a proper elevation so that when the plates 60 are rotated their arcuate edges will properly engage adjacent members and hold them. In order to accomplish this, the adjusting means 12 is provided and when the frame members 5 and 6 are moved to a skewed relation, the connecting rods 9 and 10 cause each of the plates 12f at each end of the frame members 5 and 6 to move therewith and to skew with the frame members 5 and 6. When this occurs the members 12f will be forced downwardly by reason of the slanting slots 12e therein which are engaged with the projections 12d on the frame members 5 and 6. The bottom flange 12b on member 12f will thereby engage the tubular objects and position the frame 4 vertically relative to the tubular objects so that the plates 60 will properly engage each tubular object.

From the foregoing description, it can be appreciated that the present invention provides a device which automatically adjusts itself to predetermined vertical position relative to the tubular objects with which it is to be engaged. Also, the plates 60 or pipe engaging means 7 are designed and constructed so that spring means normally urge them to non-engaging relation so that as the device is lowered to resting position, the pipe engaging means 7 will automatically release from engagement, if the device is loaded and another load of pipe to engage the pipe when the plates 60 are rotated.

Broadly the invention relates to a pipe engaging device and more particularly to a pipe engaging device wherein means are provided to automatically adjust the pipe engaging means relative to the device for engaging pipe of any diameter, and spring means for returning the pipe engaging means to a non-engaging relationship when the pipe and device are lowered to a rest position.

What is claimed is:

1. A device for lifting a plurality of tubular members including a frame, said frame including paired horizontally disposed members, means interconnecting said paired members to maintain them in spaced relation, a tubular support mounted on each of said horizontally disposed frame members and extending vertically upwardly therefrom, a plurality of tubular engaging members rotatably mounted in each of said horizontally disposed members, means interconnecting said tubular engaging members of each horizontally disposed member for simultaneous rotation of said tubular engaging members of each horizontally disposed member, a vertically extending member rotatably mounted in each of said supports and each being connetced at its lower end to said interconnecting means and extending at its upper end above said supports, actuating means extending between and slidably supported on said vertically extending rotatable members, a pin extending from each of said rotatably mounted members, a slot in said actuating means in which said pins are engaged, said slot being shaped so that vertical movement of said actuating means relative to said rotatable member causes said pins engaged in said slot to rotate said rotatable members which in turn move said interconnecting means to urge said tubular engaging members to tubular engaging position.

2. The combination recited in claim 1 including means locking said actuating means on each of said vertically extending members to retain said tubular engaging members in non-rotated, non-engaging position.

3. The combination recited in claim 1 including means locking said actuating means on each of said vertically extending members to retain said tubular engaging members in non-rotated, non-engaging position, said interconnecting means between said horizontally disposed members being pivotally mounted on each of said horizontally disposed members, means extending between said horizontally disposed members to accommodate skewing of said horizontally disposed members to change the lateral spacing between said tubular engaging means, and additional means carried by each of said horizontally disposed members to position said frame vertically relative to the tubular members to be engaged at any relationship of said frame.

4. The combination recited in claim 1 including spring means connected between said actuating means and said rotatable vertical members normally in relaxed position, but operable when said actuating means is moved vertically upwardly to tend to urge said tubular engaging members to their non-tubular engaging position.

5. The combination recited in claim 1 including means locking said actuating means on each of said vertically extending members to retain said tubular engaging members in non-rotated, non-engaging position, said interconnecting means between said horizontally disposed members being pivotally mounted on each of said horizontally disposed members, means extending between said horizontally disposed members to accommodate skewing of said horizontally disposed members to change the lateral spacing between said tubular engaging means, additional means carried by each of said horizontally disposed members to position said frame vertically relative to the tubular members to be engaged at any relationship of said frame and said actuating means and said rotatable vertical members normally in relaxed position, but operable when said actuating means is moved vertically upwardly to tend to urge said tubular engaging members to their non-tubular engaging position.

6. A pipe engaging and lifting device including a frame, said frame including paired horizontally extending members, pipe engaging members carried by each of said horizontally extending members for rotation about their vertical axis when said frame is rested on the pipe to engage the pipe, means to rotate said members to pipe engaging position whereby the pipe may be engaged and lifted and additional means to urge said members to a non-engaging pipe relation when said frame and pipe therein are lowered to rest, said pipe engaging members being twisted along their vertical longitudinal axis to provide greater contact surface between said pipe engaging means and pipe.

7. The combination recited in claim 1 including means locking said actuating means on each of said vertically extending members to retain said tubular engaging members in non-rotated, non-engaging position, and additional means to release said locking means whereby said actuating means is free to move upwardly to actuate said tubular engaging means.

8. The combination recited in claim 1 including means locking said actuating means on each of said vertically extending members to retain said tubular engaging members in non-rotated, non-engaging position, additional means to release said locking means whereby said actuating means is free to move upwardly to actuate said tubular engaging means, said interconnecting means between said horizontally disposed members being pivotally mounted on each of said horizontally disposed members, means extending between said horizontally disposed members to accommodate skewing of said horizontally disposed members to change the lateral spacing between said tubular engaging means, and additional means carried by each of said horizontally disposed members to position said frame vertically relative to the tubular members to be engaged at any relationship of said frame.

9. The combinatoin recited in claim 1 including means locking said actuating means on each of said vertically extending members to retain said tubular engaging members in non-rotated, non-engaging position, additional means to release said locking means whereby said actuating means is free to move upwardly to actuate said tubular engaging means, said interconnecting means between said horizontally disposed members being pivotally mounted on each of said horizontally disposed members, means extending between said horizontally disposed members to accommodate skewing of said horizontally disposed members to change the lateral spacing between said tubular engaging means, additional means carried by each of said horizontally disposed members to position said frame vertically relative to the tubular members to be engaged at any relationship of said frame and said interconnecting means between said horizontally disposed members being pivotally mounted on each of said horizontally disposed members to accommodate skewing of said horizontally disposed members to change the lateral spacing between said tubular engaging means, and additional means carried by each of said horizontally disposed members to position said frame vertically relative to the tubular members to be engaged at any relationship of said frame.

References Cited in the file of this patent

UNITED STATES PATENTS

| | | |
|---|---|---|
| 1,956,231 | Thomas | Apr. 24, 1934 |
| 1,974,891 | Poliakoff | Sept. 25, 1934 |
| 2,030,721 | Scott | Feb. 11, 1936 |
| 2,213,718 | Reed et al. | Sept. 3, 1940 |
| 2,847,245 | Leslie | Aug. 12, 1958 |
| 2,902,311 | Reel | Sept. 1, 1959 |

FOREIGN PATENTS

| | | |
|---|---|---|
| 87,666 | Norway | July 9, 1956 |